United States Patent [19]

Murakami et al.

[11] 4,079,386
[45] Mar. 14, 1978

[54] CAMERA WITH DIGITAL CONTROL DEVICE

[75] Inventors: Hiroyashu Murakami, Tokyo; Tadashi Ito, Yokohama; Fumio Ito, Yokohama; Nobuaki Sakurada, Yokohama; Masaharu Kawamura, Hino; Nobuhiko Shinoda, Tokyo, all of Japan

[73] Assignee: Canon Kabushiki Kaisha, Tokyo, Japan

[21] Appl. No.: 678,558

[22] Filed: Apr. 20, 1976

[30] Foreign Application Priority Data

Apr. 23, 1975 Japan ................... 50-49383

[51] Int. Cl.² ................ G03B 17/00; G03B 7/08
[52] U.S. Cl. .................... 354/23 D; 354/38; 354/60 A; 354/271; 354/289
[58] Field of Search ............. 354/23 D, 24, 29, 38, 354/43, 44, 48, 50, 51, 60 R, 60 A, 289, 271

[56] References Cited

U.S. PATENT DOCUMENTS

| 3,928,858 | 12/1975 | Sakurada et al. | 354/23 D |
| 3,971,048 | 7/1976 | Ito et al. | 354/60 L |

FOREIGN PATENT DOCUMENTS

| 2,316,261 | 10/1974 | Germany | 354/23 D |
| 2,517,623 | 10/1975 | Germany | 354/23 D |

Primary Examiner—Russell E. Adams
Attorney, Agent, or Firm—Toren, McGeady and Stanger

[57] ABSTRACT

The present invention relates to a camera with a displacement means for controlling the exposure amount as the function of the mechanical displacement position. The displacement means are so designed that a brush is slid over a comb-shaped conductive pattern mechanically linked with the displacement means so as to convert the displacement position of the displacement means into a pulse number. Further, when the pulse number reaches a certain determined value, the displacement means is stopped in such a manner that the pulse number corresponds with the exposure amount and characterized in that, by determining the position at which each conductor of the comb-shaped conductive pattern is provided, relative to the position at which the displacement means stops in accordance with the displacement speed of the displacement means, the displacement amount of the displacement means due to the time delay since the pulse number reaches a certain determined amount till the displacement means actually stops is compensated so that the pulse number always corresponds with the displacement position in a precise way.

14 Claims, 11 Drawing Figures

SHUTTER DIAL OR FILM SENSITIVITY DIAL

CAMERA WITH DIGITAL CONTROL DEVICE

FIELD OF THE INVENTION

The present invention relates to an improvement of the mechanical-electrical converting device of the photographic information in the exposure amount control device of the camera, especially with the digital operational device for operating various photographic informations is converted into digital values.

DESCRIPTION OF THE PRIOR ART

Generally, in the case of the exposure amount control device for a camera in which various photographic informations are converted into digital values so as to be operated in a digital way in order to control the shutter speed and the aperture value and in order to actually control the aperture of the photographic lens by means of the output pulses of the exposure operational circuit operating in accordance with the set shutter speed, the set film sensitivity and the brightness of the object to be photographed, the aperture information of the photographic lens is converted into the value of a resistance through which a current flows. Thus, the aperture information is converted into an analog electrical amount, which analog amount is converted into digital value by means of an analog to digital converter that so the digital value is compared with the output pulse of the above mentioned exposure operational circuit so as to control the aperture. However, in accordance with above mentioned method, the aperture information of the actual diaphragm mechanism is converted into analog amount which is again converted into digital value by means of an analog to digital converter so that an analog to digital converter is necessary. This makes the circuit complicated and also makes the control device itself large. Therefore, such control device is not only convenient for a small camera but also its production cost becomes high.

Thus, a method in accordance with which a means for converting at least one photographic information into the mechanical displacement value, a comb shaped conductive pattern and a slide brush slidable over the pattern as a mean for directly converting the displacement amount of the above mentioned means into pulse number, whereby the pulse number is obtained from the switching on and off operation by sliding the slide brush over the comb shaped conductive pattern so as to carry out the control in a digital way is already known. However, when such method is applied to the digitally controlled camera in order to control aperture, namely, in the case of a digital information corresponding to the aperture value for a proper exposure is put in a register, the brush is slided over the comb shaped pattern in functional engagement with the movement of the aperture control member, a coincidence signal is produced when the number of the pulses obtained from the slide of the brush coincides with the digital value put in the above mentioned register and by means of the coincidence signal the movement of the above mentioned aperture control member is stopped so as to determine the control position of the aperture control member, a certain determined time is necessary since the production of the coincidence signal till the actual stop of the movement of the aperture control member so that the position at which the aperture control member actually stops does not coincide with the position at which the coincidence signal is produced but is the position a certain determined distance beyond it. Further the displacement amount of the aperture control member up to the position at which the aperture control member actually stops since the production of the coincidence signal depends upon the displacement speed of the aperture control member so that the displacement amount differs in accordance with the time point at which the above mentioned coincidence signal is produced in case of the aperture control member whose displacement speed is not constant but accelerated at the beginning and then constant after a certain determined displacement. The teeth of the comb shaped conductive pattern is arranged with an equal distance between the adjacent teeth so that the distance between the adjacent stop position of the aperture control member is not equal, which is inconvenient. When the comb shaped conductive pattern is arranged with an equal distance between the adjacent teeth while the movement of the aperture control means is accelerated, the distance between the adjacent stop position of the aperture control member has the tendency for increase, while in the case of the aperture control in which the aperture should be controlled with the aperture value exactly proportional to the number of the pulse signals, it is necessary that the distance between the adjacent stop position should be constant so that the conventional comb shaped pattern with the equal distance between the adjacent teeth cannot be applied, which is also inconvenient. Further the conventional comb shaped pattern has such shortcomings that due to the difference between the height of the comb shaped conductive pattern and that of the insulation base plate on which the pattern is provided, the pattern at the starting position of the slide motion is subject to the wear, that the time in which the slide brush is in contact with the comb-shaped pattern is not equal to that in which the slide brush is not in contact with the pattern, that depending upon the contact position of the slide brush with the pattern the value of the resistance between two terminals varies and so on so that a stabilized digital control can not be obtained, which is also inconvenient.

SUMMARY OF THE PRESENT INVENTION

A purpose of the present invention is to offer a comb-shaped pattern so designed that the distance between the adjacent stop positions of the aperture control member is always constant.

Another purpose of the present invention is to offer a comb-shaped pattern so controlled that the stopping positions of the control member can be chosen at the desired position by making the distance between the adjacent teeth of the comb-shaped pattern the determined distance.

Further another purpose of the present invention is to offer a camera with the digital control device having a comb-shaped pattern suitable for the movement characteristics of the aperture control member by gradually increasing the distance between the adjacent teeth of the comb-shaped pattern along the slide direction from the starting position and making the distance equal after a certain determined position.

Further other purposes of the present invention will be disclosed from the explanation made in detail in accordance with the accompanying drawings.

DESCRIPTION OF THE PREFERRED EMBODIMENTS

Figure 1:
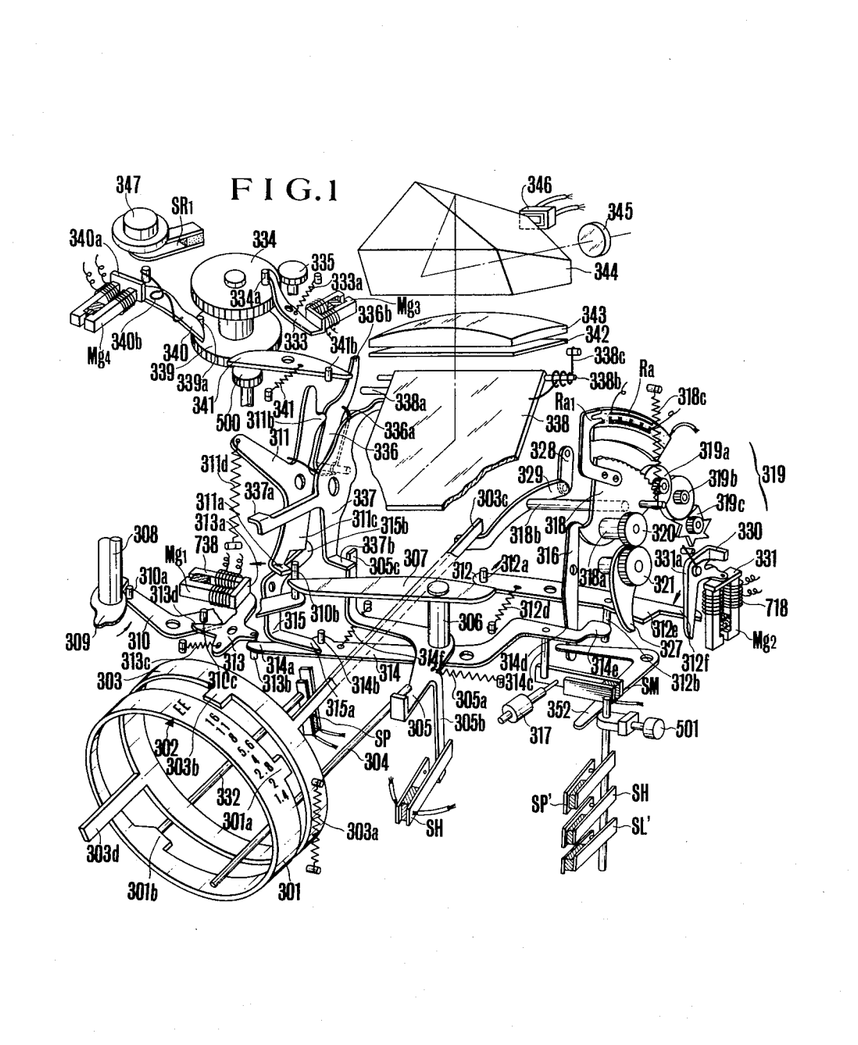
FIG. 1 shows an embodiment of the mechanism of the camera with the digital control device in accordance with the present invention in perspective view.

FIG. 1 shows an embodiment of the mechanism of the aperture control member of the camera with the digital control device in accordance with the present invention, whereby the film has been wound up while the shutter has been charged. 301 is the aperture ring, which is provided with the automatic aperture index EE and the manual aperture index as well as the projecting part 301a and the cam part 301b. 302 is the index for making the automatic aperture index EE with the manual aperture index. 303 is the aperture presetting ring, which is urged in the clockwise direction by means of a spring 303a, presenting a projecting part 303b engageable with the projecting part 301a of the above mentioned ring 301. The aperture presetting ring 303 is provided with the arm 303c, being intended to determine the rotation of a bell crank by means of a lever 303d provided on the aperture presetting ring 303 through the aperture setting cam ring not shown in the drawing, whereby the bell crank is intended to control the rotation of the diaphragm driving ring not shown in the drawing so as to determine the opening degree of the diaphragm. 303 is a pin which is provided on the above mentioned diaphragm driving ring in such a manner that the end of the pin 304 is engaged with the automatic aperture lever 305 urged in the counterclockwise direction by means of a spring 305a. The automatic aperture lever 305 present a rising up part 305c and a falling down part 305d, whereby the falling down part 305c is engaged with the movable contact of the hold switch SH. An intermediary lever is provided at 306 coaxially with the automatic aperture lever 305. 308 is the winding up shaft of the winding up lever not shown in the drawing, whereby on the end surface of the winding up shaft 308 the winding up cam 309 is fixed. 310 is the rotatable intermediary lever, whereby the pin 310a provided at the one end of the intermediary lever 310 is engaged with the winding up cam 309. At the other end of the intermediary lever 310 a pin 310b is provided so as to be engaged with the one end of the above mentioned intermediary lever 307 and at the same time with the one end 311a of the mirror driving lever 311. Further by means of the pin 310c provided on the intermediary lever 310 the first holding lever 313 is charged. Hereby the other end of the intermediary lever 307 is engageable with the pin 312a provided at the one end of the rotatable charge lever 312. This charge lever 312 is urged in the counterclockwise direction by means of the spring 312d. $Mg_1$ is the first holding magnet with a permanent magnet being engaged with the one end 313a of the first holding lever 313, while the other end 313b is engaged with the one end 314a of the release lever and the spring 313c. Further by means of rotation, the pin 310c provided on the intermediary lever engages with the cam face 313d at the one end of the above mentioned first holding lever 313. At the one end of the release lever 314 a pin 314b is provided so as to hold the other end 315a of the mirror driving engagement lever 315 whose one end 315b is engaged with the one side 311c of the above mentioned mirror driving lever 311. Hereby at the ends 314d and 314e of the release lever 314 the one end of the rotatable EE holding lever 316 as well as the pin 312b provided on the above mentioned charge lever 312 are held. Further at the other end of the release lever 314 a pin 314c is provided and the movable contact of the memory keeping switch SM is held. Hereby the movable contact of this switch SM is directly held by means of the lock button 317 of EE. This release lever 314 is urged in the counter-clockwise direction by means of a spring 314f. 318 is the EE sector gear being held at the other end of the above mentioned holding lever 316. This sector gear 318 is engaged with the gears 319a, 319b and the stop wheel 319 composing a speed adjusting mechanism 319. Further on the sector gear 318, the slide member $Ra_1$ of the pulse generating switching means Ra for determining the preset aperture value is provided. On the shaft 318a of this sector gear 318 a gear 320 is mounted so as to be engaged with the EE charge gear 321. A lever 327 is fixed coaxially with this gear 321, being in contact with the other stepped part 312e of the above mentioned charge lever 312. On the above mentioned sector gear 318 a pin 318b is provided whereby the end surface of this pin 318b is fixed on the signal lever 329 pivoted on the support lever 328. The folded end of this signal 329 holds the arm 303c of the aperture presetting ring 303. The above mentioned EE sector gear 318 is strongly urged in the clockwise direction against the spring 318c urged in the counter-clockwise direction on the sector gear.

$Mg_2$ is a control magnet with a permanent magnet, so designed as to attract the iron piece provided on the lever 330 to be attracted. This lever 330 to be attracted is urged in the counter-clockwise direction by means of a spring 331a, whereby the one folded end of the lever 330 is designed so as to be engageable with the stop wheel 319c of the speed adjusting mechanism 319. Further with the other end of the lever 330 to be attracted the other branched end 312f of the charge lever 312 is in contact. Further a pin in contact with the movable contact piece of the manual switch Sp is provided at the side of the lens in such a manner that the pin 332 is in contact with the cam part 301b of the above mentioned aperture ring 301. The above mentioned mirror driving lever 311 presents a delay device not shown in the drawing, whereby the mirror driving lever 311 is urged in the counter-clockwise direction by means of the spring 311d while its one end is held at the other side of the above mentioned mirror driving engagement lever 315. The front shutter plane holding lever 333 is urged in the counter-clockwise direction by means of a spring 333a whereby its one end is engaged with the pin 334a provided on the front shutter plane gear 334 while its other end is so designed as to be attracted by the shutter controlling magnet Mg₃ with a permanent magnet.

This front shutter plane gear 334 is engaged with the front shutter plane pinion 335 of the front shutter plane drum.

At the holding part 311b of the above mentioned mirror driving lever 311 the mirror holding lever 336 is held. This holding lever 336 is urged in the counter-clockwise direction by means of the spring provided between the lever 336 and the mirror driving lever 311 whereby its one end is engaged with the push up lever 337 provided coaxially with the mirror driving lever 311.

The one end 337a of the push up lever 337 is so designed to be rotated in the clockwise direction by means of the mirror raising up motion for raising up the mirror itself. At the other end of this push up lever 337 the spring up pin 338a provided on the mirror 338 is held. This mirror is so designed as to be rotated around the mirror shaft 338b. 338c is the spring for returning the spring. 339 is the rear shutter plane gear provided coaxially with the above mentioned front shutter plane gear but separately therefrom, being engaged with the rear shutter plane pinion 500 for the rear shutter plane drum. Further on the rear shutter plane gear 339 a pin 339a is provided. 340 is the lever to be attracted, being rotated by means of the above mentioned pin 339a and so designed as to be attracted by the shutter control magnet with a magnet with its iron piece 340a. This lever 340 to be attracted is normally urged by means of a spring 340b so as to be rotated toward and held at the magnet Mg₄. 341 is the rear shutter plane signal lever to be rotated by means of the above mentioned pin 339a, being normally rotated toward and held at the holding pin 341b by means of a spring 341a. The end 336b of the above mentioned mirror holding lever 336 and the above mentioned rear shutter plane signal lever 341 are held. Hereby the light beam passing through the photographic lens not shown in the drawing can be seen at the eye piece by the photographer through the mirror 338, the focal plate 342, the condenser lens 343 and the pentagonal prism 344 in sequence. 346 is a light sensing element such as silicone blue cell. 347 is the shutter button with the first release switch SR₁ in it. 501 is the exposure amount display button, whereby when the button 501 is pushed down the L-shaped lever 352 is rotated in the clockwise direction while the display switch SP', the hold switch SH' and the lamp switches SL and SL' (FIG. 2) are closed.

Figure 2A:
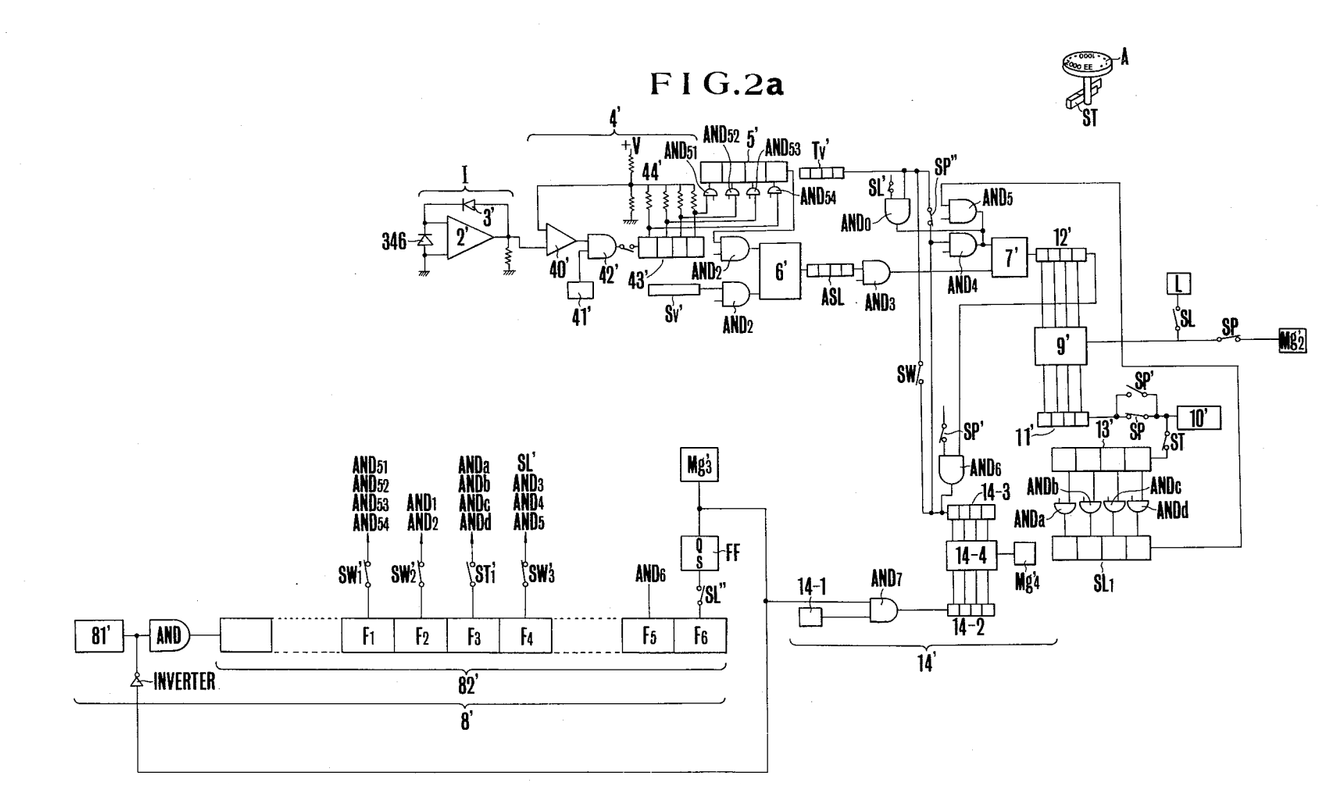
FIG. 2(a) shows a circuit diagram of an embodiment of the camera with the digital control device in accordance with the present invention.

FIG. 2(a) shows a circuit diagram of an exposure control circuit applicable to a camera with the digital control device in accordance with the present invention, where I is the light measuring part shown in FIG. 1 and consisting of a light sensing element 346 such as silicone photocell, an operational amplifier 2' and a Log. diode for measuring the light beam from the object to be photographed and compressing it in a logarithmical way. 4' is an analog to digital converter for converting the output of the light measuring part I into digital value. The analog to digital converter is a conventional follow comparison type analog-to-digital converter consisting of a comparator 40', a pulse generator 41', an AND gate 42', a 4-bit binary counter 43' and a digital-analog converter 44 consisting of a group of resistances each connected to each output terminal of the Flip-Flops composing the binary counter and provided with weight. 5' is a parallel in serial out shift register, AND51 - AND54, AND gates connected to the respective bit of the shift register and Sv' a shift register in which a digital value corresponding to the Log. value Sr of the film sensitivity. AND1 and AND2 are AND gates and 6' an adder for adding the object brightness value Bv in the register 5' to the film sensitivity value Sv compressed into digital value in a logarthmical way.

ASL is a shift register connected to the output terminal of the adder 6' while 7' is a subtracter whose one input terminal is connected to the registers ASL and Tv' through the AND gate AND3 and the switch SL'. To the other input terminal of the subtracter 7' and AND gates AND4 and AND5 are connected in such a manner that the subtracter 7' is supplied with the shutter speed value Tv compressed into digital value in a logarthmical way through the switch SP" and AND4 in the case with priority on shutter speed and with the aperture value Av compressed into digital value in a logarithmical way through the AND gate AND3 in case with priority on aperture value.

12' is a shift register which stores the Av value operated by the above mentioned subtracter 7' in case with priority on shutter speed and the Tv value in the case with priority on aperture value. 10' is the aperture step number pulse generating circuit for producing pulses in functional engagement with the diaphragm of the photographic lens. SP is the shutter priority switch being closed in case with priority on shutter speed. 11' is the binary counter for counting the pulses produced by the above mentioned pulse generating circuit through the switch SP in a binary way. 9' is the coincidence detecting circuit for producing an output so as to actuate the circuit Mg' including the aperture control magnet Mg₂ through the switch SD when the aperture value stored in the above mentioned register 12' coincides with the pulse signal of the counter 11'.

8' is a sequence control circuit consisting of a pulse generator 81' to be actuated by the pushing down of the above mentioned shutter button and a ring counter 82' for shifting the pulses from the pulse generating circuit 81'. F₁ - F₆ make a part of the Flip-Flops composing the ring counter, whereby the output terminal of F₁ is connected to the one input terminal of each of the above mentioned AND gates AND51 - AND54 through the switch SW₁'. Further the output terminal of F₂ is connected to the one input terminal of each of the AND gates AND1 and AND2 through the switch SW₂. The output terminal of F₃ is connected to the one input terminal of each of the AND gates ANDa - ANDd through the switch ST'. The output terminal of F₄ is connected to the one input terminal of each of the AND gates AND3 - AND5 through the switch SW₃'. The output terminal of F₅ is connected to the one input terminal of the AND gate AND6 through the switch ST'. The output of F₆ is connected to the set terminal S fo the Flip-Flop FF whose output terminal is conncted to the front shutter plane driving circuit Mg₃' including the magnet Mg₃ and at the same time, to the one input terminal of the AND gate AND7. 13' is a binary counter connected to the pulse generating circuit 10' through the switch ST mechanically linked with the shutter dial A so as to be closed in case with priority on aperture value. $SL_1$ is a shift register supplied with the content of the binary counter 13' through the AND gates ANDa - ANDd parallely. 14' is the shutter time control circuit, whereby 14-1 is a pulse generator, 14-2 a binary counter for counting the pulses supplied from the pulse generator 14-1 through the AND gate AND7 in a binary way, 14-3 a shift register, 14-4 the coincidence detecting circuit for detecting the coincidence of the content of the counter 14-2 with that of the register 14-3 and $Mg_4'$ a rear shutter plane control circuit including the rear shutter plane control magnet $Mg_4$, being actuated in response with the output of the coincidence detecting circuit 14-4. L is a display circuit including a lamp while SD is a magnet switch mechanically linked with the above mentioned manual switch SP. ST' is a switch mechanically linked with the switch ST. SP' is a display switch mechanically linked with the lamp switches SL, SL' and SL". SW is a manual control switch while the switches $SW_1'$- $SW_3'$ are mechanically linked with the switch SW. The above mentioned switch $ST_1'$ is also mechanically linked with the switch ST. Hereby the frequency of the above mentioned pulse generator 81' is chosen comparatively long in such a manner that the transfer and the operation between the registers can be carried out while the ring counter is producing the output.

Figure 2B:
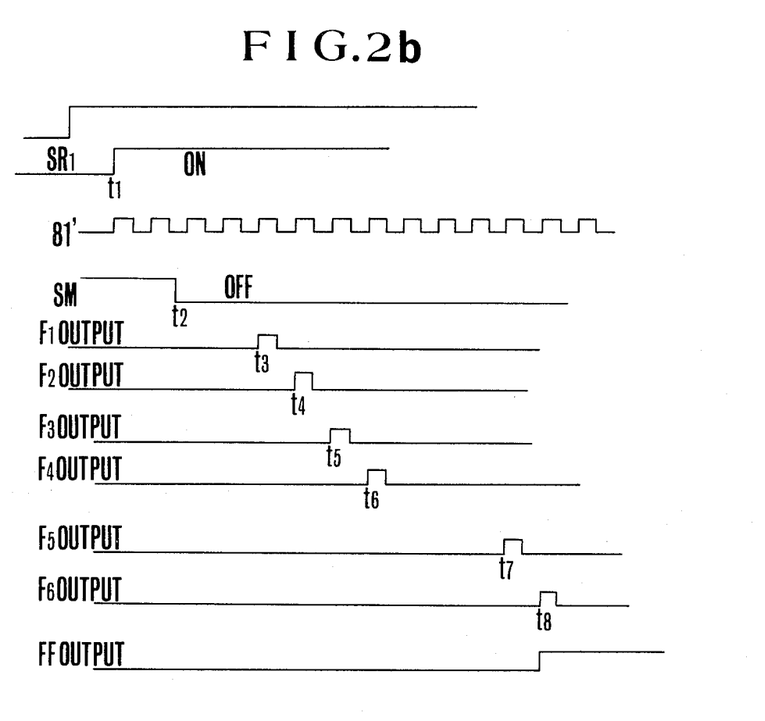
FIG. 2(b) shows timing charts for explaining the operation of the circuit shown in FIG. 2(a).

FIG. 2(b) shows timing charts for explaining the operation of the circuit shown in FIG. 2(a).

Figures 3A, 3B, 3C:
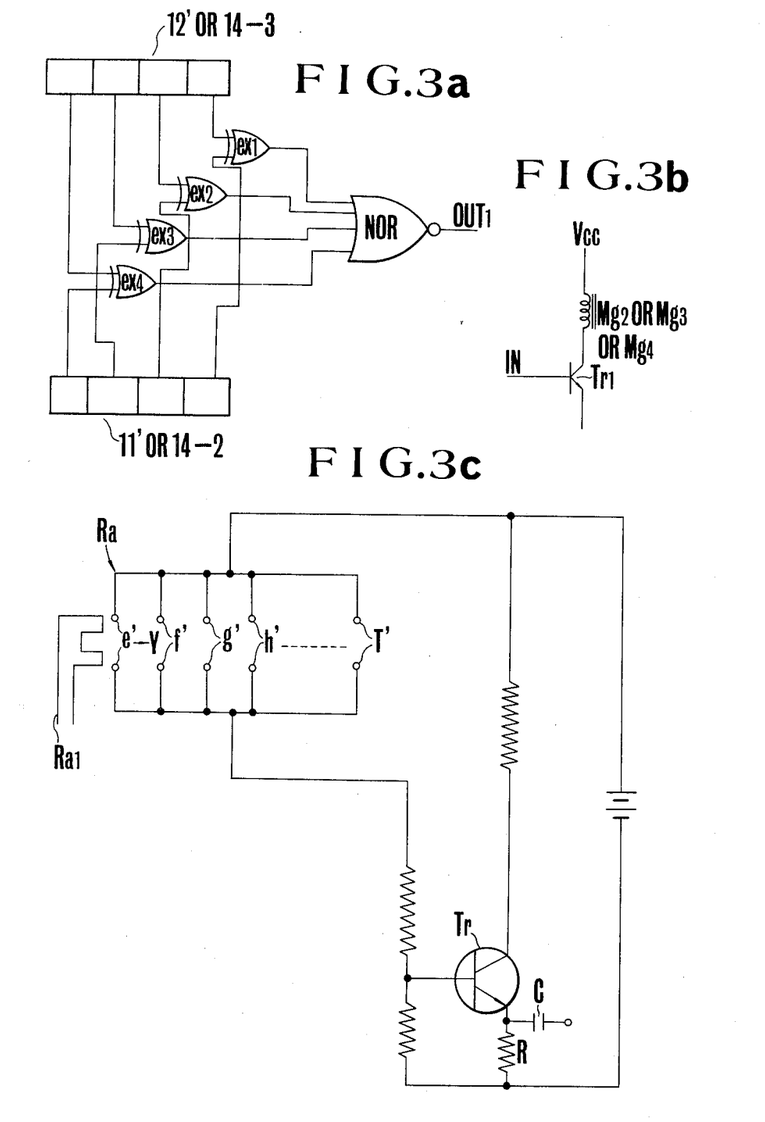
FIG. 3(a) shows a circuit diagram of an embodiment of the coincidence detecting circuit in the circuit shown in FIG. 2(a).
FIG. 3(b) shows a circuit diagram of an embodiment of the circuit $Mg_2$, $Mg_3$ or $Mg_4$ in the circuit shown in FIG. 2(a).
FIG. 3(c) shows a circuit diagram of an embodiment of the pulse generating circuit 10' in the circuit shown in FIG. 2(a).

FIG. 3(a) shows a circuit diagram of an embodiment of the coincidence detecting circuit 9' and 14-4 in the circuit shown in FIG. 2(a), whereby the detecting circuit consists of exclusive OR gates $ex_1 - ex_4$, and a NOR circuit NOR.

FIG. 3(b) shows a circuit diagram of an embodiment of the circuit $Mg_2'$, $Mg_3'$ and $Mg_4'$ in the circuit shown in FIG. 2(a), consisting of a transistor $Tr_1$ and a magnet, whereby the base terminal of the transistor $Tr_1$ is connected to the output terminal of the Flip-Flop FF, of the coincidence detecting circuit 9' or 14-4.

FIG. 3(c) shows an embodiment of the aperture step number pulse generating circuit 10' shown in FIG. 2(a), whereby Ra is the pulse generating switch means shown in FIG. 1, while 1' - T' are the contacts of the switching means. $Ra_1$ is the slide member shown in FIG. 1 and mechanically linked with the diaphragm so as to move along the direction of the arrow Y for producing pulses by contacting with the contacts 1' - T'. Tr is a transistor to be closed for producing an output when the above mentioned slide member is brought into contact with the contacts. C is a condenser while R" is a resistance, whereby a differentiating circuit consists thereof for differentiating the output of the above mentioned transistor Tr for producing pulses. E is the current source.

Figure 3D:
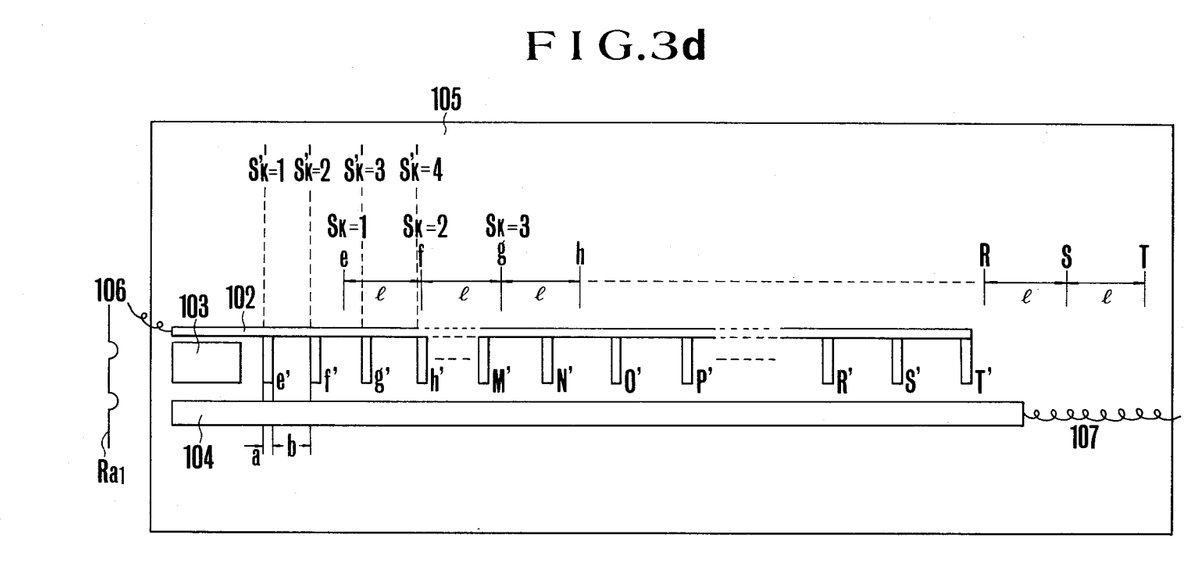
FIG. 3(d) shows a composition of an embodiment of the slide member $Ra_1$ and the contacts 1' - 7' shown in FIG. 3(c).

FIG. 3(d) shows a concrete composition of the slide member $Ra_1$ and the contacts 1' - T' shown in FIG. 3(c) whereby 1' - T' form a comb-shaped conductive pattern. In the drawing, $Ra_1$ is a side view of the slide member as brush slidable over the pattern. By its slide motion to the left and the right over the pattern the pulse signals are produced. 102 is the comb-shaped conductive pattern, being secured over the insulation base plate 105 by means of the metallization or the conductor piece. 103 is an independent pattern provided at the position from which the slide motion starts, in such a manner that by the slide motion of the slide member over the pattern not only the slide motion starting position signal is obtained but also the pattern serves to reduce the wear of the first part of the comb-shaped conductive pattern.

Hereby in the drawing, the black part is the conductive pattern while the white part is the surface of the insulation base plate.

104 is the common returning pattern provided in parallel with the comb-shaped pattern whereby 106 and 107 are the terminal conductors of the comb-shaped pattern and the common returning pattern respectively. Hereby $a$ is the width of the conductor of the comb-shaped pattern along the sliding direction, while $b$ is the distance between the adjacent patterns. The reason why the above mentioned pattern 103 is provided is as follows. In case the brush $Ra_1$ slides over the pattern, due to the difference between the height of the base plate 105 and the pattern especially the comb-shaped pattern $e'$ at the position from which the brush starts to slide is subject to the wear so that in order to avoid the wear an independent slide motion start position pattern 103 other than the comb-shaped pattern is provided at the slide motion starting position in such a manner that a slide motion start position signal is obtained but also the comb-shaped pattern is protected.

Further the distance between the adjacent patterns becomes longer from $e'$ to $M'$ gradually and remains equal from $M'$ to $T'$.

Further the reason why the common returning pattern 104 is provided in parallel with the comb-shaped pattern 102 along the sliding direction while its terminal conductor 107 is provided at the other end of that at which the terminal conductor 106 of the comb-shaped pattern is provided is as follows. In case the comb-shaped pattern 102 consists of a metal coating while the thickness of the coating is remarkably thin, even in case the conductive pattern consists of gold, its resistance value becomes remarkable in such a manner that in accordance with the relation of the sliding position of the brush to the pattern the value of the resistance between the terminal conductor of the pattern and the sliding position fluctuate so that with the above mentioned composition the fluctuation of the resistance value due to the sliding position is compensated. Hereby the value of the resistance between both electrodes are kept constant by properly choosing the coating thickness of the common returning pattern 104 and its external shape.

Further the reason why the width $a$ of each comb of the comb-shaped pattern is chosen smaller than the distance between the adjacent combs is as follows. The contact of the slide brush $Ra_1$ with the comb-shaped pattern 102 is not the point contact but presents a certain contact area, while when the width of a comb is chosen equal to the distance between the adjacent combs, due to the difference between the height of the conductive part of the comb-shaped pattern with that of the base plate the pulse signals hereby obtained presents different length of the switched on part and the switched off part. In order to compensate this difference in accordance with the present invention the width $a$ is chosen smaller than the distance $b$ in such a manner that the pulses with equal distance convenient for the treatment in the electrical circuit can be obtained.

Figure 4:
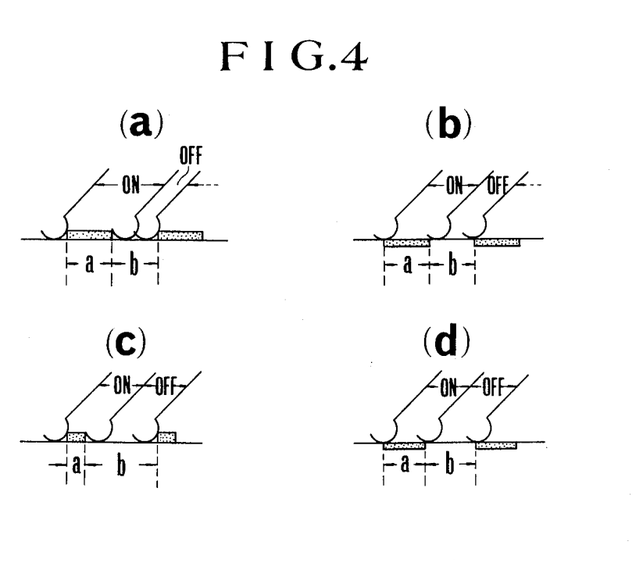
FIG. 4 shows sketches for explaining the contact state of the brush with the pattern shown in FIG. 3(d).

FIG. 4 shows the contact state of the slide brush with the comb-shaped pattern, whereby when the thickness of the conductive part of the pattern is large the contact state is as is shown in FIG. 4(a), while when the thickness is remarkably thin, the contact state is as is shown in FIG. 4(b). In the latter case the switched on time and the switched off time of the brush and the pattern are not as is shown in the drawing. FIG. 4(c) and FIG. 4(d) show the case the width a is chosen smaller than the distance b in such a manner that the switched on time is nearly equal to the switched off time.

Below the operation of the camera with the digital control device in accordance with the present invention will be explained.

In case with priority on shutter speed at first the EE index of the aperture ring 301 is brought in coincidence with the index 302 as is shown in the drawing, when due to the contact relation of the cam part 301b with the pin 332 the manual switch SP as well as the switches SP" and SD are closed in such a manner that the aperture step number pulse generating circuit 10' is connected to the register 11'.

Hereby the current source switch not shown in the drawing is closed so as to bring each circuit in the operation state, and the film sensitivity is set by means of the film sensitivity setting dial to be explained later so as to deliver the digital value corresponding to the set film sensitivity to the register Sv' while the shutter dial A is so operated as to deliver the digital value corresponding to the set shutter time to the register Tv'.

When then the shutter button 347 is pushed down, the first release switch $SR_2$ is closed in such a manner that the first holding magnet $Mg_1$ with a permanent magnet is excited in the reversed direction so as to loose the magnetic force so that the first holding lever 313 is rotated in the clockwise direction by means of the spring 313c. Namely, the engagement on the one end 313b of the first holding lever 313 with the one end 314a of the release lever 314 is solved so that the release lever 314 is rotated in the counter-clockwise direction by means of the spring 314f.

Further due to the closing of the switch $SR_1$ the pulse generator 81' is triggered into the operation state, delivering the pulse to the ring counter 82'. On the other hand, the light measuring system I and the analog to digital converter 4' are in the operation state since the current source switch has been closed, converting the output of the operational amplifier 2' into digital value to be delivered to the binary counter 43'. Namely when the current source switch is closed, the light beam from the object to be photographed reaches the light sensing element 346 which produces an output corresponding to the brightness of the object to be photographed, which output is delivered to the input terminal of the analog to digital converter 4' through the operational amplifier 2' and the Log diode 3' and to the one input terminal of the comparator. On the other hand, the pulses produced by the pulse generator 41' are delivered through the AND gate 42' and the switch SM to the binary counter 43' so as to be counted in a binary way there. Further at this time the content counted by the counter in the binary counter is converted by a digital to analog converter consisting of a group of resistances with weight into analog amount and delivered to the other end of the comparator 40' to be compared with the output of the operational amplifier 2'. When the content of the counter 43' reaches a value corresponding to the output of the operation amplifier 2', the output of the digital to analog converter coincides with the output of the operation amplifier 2' so that the output of the comparator is inversed whereby the AND gate is closed so as to terminate the analog to digital conversion. When on the other hand, the ring counter 82' is supplied with a certain determined number of the pulses from the pulse generator 81', the Flip-Flop $F_1$ starts to produce an output (FIG. 2(b)), which is transferred to the AND gates AND51 - AND54 while the content of the counter 43' is transferred to the shift register 5'. When then the next pulse is delivered to the ring counter 82' the Flip-Flop $F_2$ starts to produce an output so as to open the AND gates AND1 and AND2 in such a manner that the digital value delivered to the register Sv' and corresponding to Log value Sv of the film sensitivity and the digital value delivered to the register 5' and corresponding to Log value Bv of the brightness are put in the adder 6' so that a digital value corresponding to Bv + Sv is put in the register ASL. After the digital value corresponding to Sv + Bv has been put in the register ASL, the Flip-Flop starts to produce an output, whereby the switch $ST_1'$ is opened so that the AND gates ANDa - ANDd remain in the closed state. When the next pulse is delivered to the counter 82', the Flip-Flop $F_4$ starts to produce an output so as to open the AND gates AND3 - AND5. Hereby the content of the register ASL and the digital valued put in the register Tv' and corresponding to the Log value Tv of the shutter time are put in the subtractor 7' in which the subtraction Bv + Sv − Tv (= Av) is carried out in such a manner that a digital value corresponding to Av is delivered to the register 12'. On the other hand, due to the rotation of the above mentioned release lever 314 the switch SM is opened through the pin 314c while the holding lever 316 is rotated in the counter clockwise direction so as to solve the engagement of the sector gear 318 with the lever whereby the gear 318 is rotated. The rotation of the sector gear 318 induces the downward movement of the signal lever through the pin 318b so that the aperture presetting ring 303 whose arm 303c is held at the signal lever 329 rotates the sector gear 318 against the force of the spring 318c in the clockwise direction by means of the spring 303a. Thus the gears 319a, 319b and 319c forming the speed adjusting mechanism 319 are rotated in such a manner that the stop wheel in the last step is rotated in the counter clockwise direction. Further the rotation of the sector gear 318 induces the slide motion of the slide member $Ra_1$ of the pulse generating switching means Ra, at each contact of the slide member $Ra_1$ with the contacts E' - T' of the pulse generating switching means Ra. Tr is brought in the switched on state so as to produce a pulse through the differentiating circuit, which pulse is counted and stored in the register 11' and transferred to the coincidence detecting circuit 9.

On the other hand, as mentioned above the digital value corresponding to Av has been put in the register 12', whereby the coincidence detecting circuit 9' is detecting the coincidence of the content of the register 12' with that of the register 11' in such a manner that when the coincidence is confirmed, the NOR gate NOR in FIG. 3(a) produces an output whereby the transister $Tr_1$ in FIG. 3(b) is brought in the switched on state so that the magnet $Mg_2$ is excited in the reversed direction, leaving the iron piece 331. In consequence the lever 330 to be attracted is rotated in the counter clockwise direction by means of the spring 331a until its folded part is engaged with the stop wheel 319c so as to stop the wheel 319c. Thus the position of the sector gear 318 is determined. In consequence when as mentioned above the rotation of the sector gear 318 stops the aperture presetting ring 303 has been rotated up to the position corresponding to the proper aperture value whereby the position of the bell crank is determined. In other words the position at which the aperture presetting ring 303 stops corresponds to the aperture value to be determined by the information from the light sensing element for measuring the light beam coming through the photographic lens and the exposure compensation information for the shutter speed and the film sensitivity.

Figure 5:
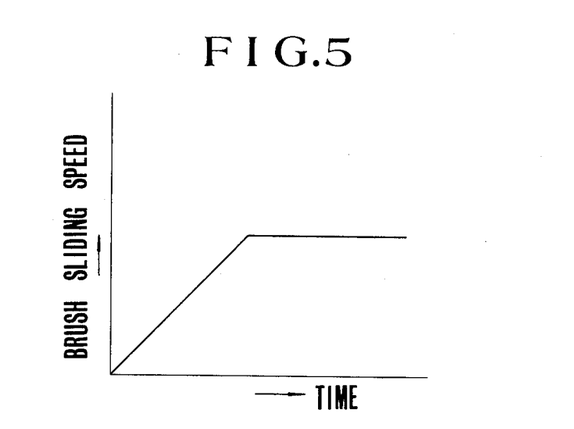
FIG. 5 shows a diagram of the slide speed of a brush.

As to the motion since the start of the rotation till its stop, as is shown in FIG. 5, at the beginning of the rotation the movement is made at a constant acceleration while after elapse of a certain determined time the movement is made at a constant speed so that the distance between the adjacent combs increased at the beginning while in the range in which the gear (the brush) moves at a constant speed the distance becomes constant in such a manner that the distance between the adjacent position at which the brush stops after the coincidence detecting circuit produces an output is constant. Namely as shown in FIG. 3(d) let us presume that the position at which the brush produces the stop signal is E, the position at which the brush actually stops is T and the distance between the adjacent stop position is equal, so the following relation is obtained;

$$S = \tfrac{1}{2}\alpha(t + T^2) = kl \quad (1)$$

Hereby $\alpha$ is the acceleration, $t$ the time for the stop signal producing time, $T$ the time delay due to the response delay of the magnet from the stop signal production till the brush stop and other factor, $k$ the whole number and $l$ the distance between the adjacent stop positions.

The position S' at which the stop signal is produced is obtained from;

$$S' = \tfrac{1}{2}\alpha t^2 \quad (2)$$

$$(t = \sqrt{(2\,kl)}/2 - T)$$

while the difference between the position at which the stop signal is produced and that at which the brush actually stops is obtained from;

$$S - S' = \sqrt{2\,k\alpha l} \cdot T - \tfrac{1}{2}\alpha T^2$$

In case of the movement at a constant speed $k$ is not a constant but a function so that if the patterns for producing the stop signals are provided at the constant distance, the distance between the adjacent positions at which the brush stops is not constant.

The distance between the patterns for producing the stop signal for making equal the distance between the adjacent position at which the brush actually stops is obtained from;

$$S'_{(K=k+1)} - S'_{(K=k)} = 1 - T\sqrt{2\,\alpha l}\,(\sqrt{k+1} - \sqrt{k})$$

According as $k$ becomes larger it is necessary to enlarge the distance between the adjacent patterns. In accordance with the above mentioned equation the distance between the adjacent patterns in the present embodiment can be determined for the movement of the brush at a constant speed, whereby in the range in which the brush moves at a constant speed the distance between the adjacent patterns is constant in such a manner that in proportion to the rotation of the brush the aperture value is determined correctly, namely the number of the produced pulses is correctly in proportion to the displacement amount of the mechanism for controlling the diaphragm.

On the other hand, with the start of such an EE operation, the automatic aperture mechanism also starts. Namely when the magnet $Mg_1$ is supplied with the reversed excitation pulse, the first holding lever 313 is rotated in the clockwise direction by means of the spring 313c while the release lever 314 is rotated in the counter-clockwise direction so that through the pin 314b the end 315a of the mirror driving engagement lever 315 is rotated in the counter-clockwise direction. Namely the engagement of the one side 311c of the mirror driving lever 311 with the one end 315b of the mirror driving engagement lever 315 is solved in such a manner that by means of the spring 311d the mirror driving lever 311 is rotated in the counter clockwise direction. Because at the same time, the claw part 311b of the mirror driving lever 311 and the holding lever 336 remain in the engaged state with each other, the push up lever 337 bearing the holding lever 336 is rotated in the counter clockwise direction. In consequence the folded part 337b of the push up lever 337 engages with the rising up part 305c of the automatic aperture lever 305 so as to rotate the automatic aperture lever 305 in the clockwise direction. Thus the hold switch SH is closed while the pin 304 provided on the diaphragm driving ring is actuated so as to close the diaphragm down to the position of the above mentioned bell crank at which the aperture value is set. Further the rotation of the push up lever 337 in the counter-clockwise direction induces the operation of the push up pin 338a for the mirror 338 so as to push up the mirror 338.

In this way the time from the closure of the diaphragm till the push up of the mirror corresponds with the time from the time point $t_1$ at which the release is operated till the time point $t_8$ at which the Flip-Flop $F_6$ produces an output, whereby at the time point the mirror is pushed up the Flip-Flop $F_6$ produces an output while the Flip-Flop FF is set in such a manner that by means of the output of the Flip-Flop FF the magnet $Mg_3$ is excited in the reversed direction.

When the magnet $Mg_3$ is excited in the reversed direction, the front shutter plane holding lever 333 is rotated in the clockwise direction by means of a pin 334a provided on the front shutter plane gear 334 being urged in the counter clockwise direction by means of a spring not shown in the drawing. Thus the front shutter plane gear 334 starts to rotate, making the front shutter plane start to run through the front shutter plane pinion 335.

By means of the output of the Flip-Flop FF the AND gate AND7 is opened in synchronization of the start of the front shutter plane whereby the pulses from the pulse generator 14-1 are delivered to the binary counter 14-2. As on the other hand, a digital value corresponding to the shutter time put in the register Tv' is put in the register 14-3 through the switch SP'', the coincidence detecting circuit 14-4 produces an output when the content of the counter 14-2 coincides with the content of the register 14-3 so as to supply current to the magnet $Mg_4$ and excite it in the reversed direction.

Consequently the lock of the rear shutter plane by means of the lever 340 to be attracted is solved so that the rear shutter plane gear 339 starts to rotate, making the rear shutter plane start to run through the rear shutter plane pinion 500. Further, when the rear shutter plane has run, by means of the rotation of the rear shutter plane gear 339 the rear shutter plane signal lever 341 is rotated in the counter-clockwise direction through the pin 339a so as to rotate the mirror holding lever 336 in the clockwise direction. By means of the rotation of the mirror holding lever 336 its engagement with the mirror driving lever 311 is solved. In consequence the push up lever 337 is rotated in the clockwise direction by means of the spring 305a through the automatic aperture lever 305, whereby the mirror 338 resumes the initial position by means of the returning lever 338c. Further at the same time, the automatic aperture lever 305 is rotated in the clockwise direction by means of the spring 305a so as to open the hold switch SH while the pin 304 provided on the diaphragm driving ring returns to the initial position so that diaphragm resumes the initial opened state.

When then by means of the winding up shaft 308 the winding up operation is carried out, the film is wound up and the shutter is charged while through the intermediary levers 310 and 307 the charge lever 312 as well as the automatic diaphragm mechanism and the mirror mechanism are charged whereby the parts whose engagements with each other were solved by the above mentioned release operation are engaged with each other into the state shown in the drawing.

Below the case of the manual operation will be explained. In the same way as in case with priority on shutter time the current source switch not shown in the drawing is closed and the desired aperture value of the aperture ring 301 is set at the index 302. By means of this the pin 332 is apart from the cam part 301b so that the manual switches SP, SP" and SD are opened. Then the sign representing the shutter speed on the shutter dial A is set at the index while the manual button not shown in the drawing is pushed down so as to close the switch SW. Because now the EE sign of the shutter dial A is apart from the index, the switches ST, ST' and $ST_1'$ are opened. Then by means of the pushing down of the shutter button 347 the first release switch $SR_1$ is closed so that the first holding magnet $Mg_1$ with a permanent magnet is excited in the reversed direction in such a manner that the first holding lever 313 is rotated in the clockwise direction by means of the spring 313c. Namely the engagement of the one end 313b of the first holding lever 313 with the one end 314b of the release lever 314 is solved in such a manner that the release lever 314 is rotated in the clockwise direction by means of the spring 314f. The rotation of the release lever 314 in the counter-clockwise direction induces the rotation of the holding lever 316 in the counter-clockwise direction so as to release its engagement with the sector gear 318. Thus the sector gear 318 is rotated in the clockwise direction against the force of the spring 318 by means of the spring 303a through the aperture presetting ring 303 and the signal lever 329 so that the signal lever 329 is moved down to a certain determined position through the pin 318b. Thus the aperture presetting ring 303 whose arm 303c is held by the signal arm 329 has been rotated by means of the spring 303a up to the position of the projection 301a of the aperture ring 301. Thus the aperture presetting ring 303 is rotated up to the position corresponding to the set aperture value whereby the position of the bell crank is determined. Further due to the rotation of the release lever 314 in the counter-clockwise direction the automatic diaphragm mechanism also starts. Namely by means of the rotation of the release lever 314 the mirror driving engagement lever 315 is rotated in the clockwise direction through the pin 314b so as to close the diaphragm in the same way as in case with priority on shutter speed and at the same time to push up the mirror 338, whereby in the same way as in case with priority on shutter speed after the shutter release at the time point $t_8$ the Flip-Flops $F_6$ as well as FF start to produce the outputs, allowing the front shutter plane to start so as to carry out the exposure, while at the same time the AND gate AND7 is opened so that the pulses are put in the binary counter 14-2 in such a manner that the shutter time is controlled in accordance with the digital value corresponding to the shutter time put in the register 14-3 through the switch SW.

Below the case with priority on aperture value will be explained. The current source switch not shown in the drawing is closed, while the EE sign of the shutter speed dial A is set at the index in such a manner that the shutter EE switch ST and the switches ST' and $ST_1'$ mechanically linked with the switch ST are closed.

Then in the same way as in case with the manual operation the aperture ring 301 is set at the desired aperture value while the above mentioned switches SP, SP" and SD are opened. When then the shutter button 347 is pushed down the first release switch $SR_1$ is closed whereby the magnet $Mg_1$ is excited in the reversed direction so as to release the engagement of the holding lever 313 with the release lever 314 so that the release lever 314 is rotated in the counter-clockwise direction whereby in the same way as in case with priority on shutter speed the memory switch SM is opened. Due to the rotation of the release lever 314 the engagement of the holding lever 316 with the sector gear 318 is solved and therefore the sector gear 318 is rotated against the force of the spring 318c in the clockwise direction by means of the spring 303a through the presetting ring 303 and the signal lever 329 so that the aperture presetting ring 303 whose arm 303c is held by means of the signal lever 329 through the pin 318b is rotated by means of the spring 303a up to the position of the projecting part 301a of the aperture ring 301 while the sector gear is rotated in the clockwise direction whereby the slide member $Ra_1$ of the pulse generating switching means Ra slides so as to produce a number corresponding to the aperture value, of pulses, which pulses are put in the binary counter 13' through the switch ST. Further the sift register 82' operates in the same way as in case with the priority on shutter time, whereby at the time point $t_3$ the Flip-Flop $F_1$ produces an output so as to open the AND gates AND51 – AND54 through the SW' and to put a digital value corresponding to Bv into the register 5' while at the time point $t_4$ the Flip-Flop $F_2$ produces an output so as to open the AND gates AND1 and AND2 and to put a digital value corresponding to Bv + Sv into the register ASL. Further at the time point $t_5$ the Flip-Flop $F_3$ produces an output so as to open the AND gates ANDa – AND∞ through the switch $ST_1'$ and to put a digital value corresponding to the aperture value Av stored in the counter 13' into the register $SL_1$. Further at the time point $t_6$ the AND gates AND3 – AND5 are opened whereby a digital value corresponding to Bv + Sv is put in the subtractor 7' through the AND gate AND3 in which another digital value corresponding to Av in the register $SL_1$ through the AND gate AND5 while Bv + Sv − Av (=Tv) is put into the register 12'. After then at the time point $t_7$ the Flip-Flop F5 produces an output which output is transfered to the AND gate AND6 through the switch ST' whereby the AND gate AND6 is opened and the digital value corresponding to Tv in the register 12' is put in the register 14-3. Then at the time point $t_8$ the Flip-Flops $F_6$ and FF produce outputs. After then in the same way as in case with priority on shutter time the exposure time is controlled.

Below the case the proper exposure amount is displayed before taking a picture by making use of the exposure amount control device in accordance with the present invention will be explained.

The current source switch not shown in the drawing is closed while the totally opened aperture value of the aperture ring 301 is set at the index 302. By this operation the manual switch SP and SP'' and the magnet switch SD are opened. Further the shutter dial is taken apart from EE while the desired shutter speed value is made to coincide with the index and the switches ST, ST' and ST$_1$' are opened. Then the proper exposure amount display button 501 is pushed down while the L-shaped lever 352 is rotated in the clockwise direction so as to release engagement of the holding lever 316 with the sector gear 318 whereby the display switch SP', the holding switch SH' and the lamp switches SL' and SL are closed while the normally closed switch SL'' mechanically linked with the switch SL' is opened.

Further by the pushing down of the button 501 the pulse generator 81' is brought into the operation state quite independently from the release operation so as to put the pulses into the ring counter 82'. Thus in the same way as is case with priority on shutter time the AND gates AND51 – AND54 are opened by means of the output of the Flip-Flop $F_1$ so as to put the digital value corresponding to Bv into the register 5' from the counter 43' while the AND gates AND1 and AND2 are opened by means of the output of $F_2$ so as to put the digital value corresponding to Bv + Sv into the register ASL, the AND gates AND0, AND3 – AND5 are opened by means of the output of the Flip-Flop $F_4$ so as to put the digital value corresponding to Tv and Bv + Sv into the subtractor 7' which produces a digital value corresponding to Av in the same way as in case with priority on shutter time.

As mentioned above, by means of the disengagement of the holding lever 316 from the sector 318 the presetting ring 303 becomes rotatable in the clockwise direction by means of the spring 303a, whereby the rotation is prevented by means of the projecting part 301a of the aperture ring 301. By changing the aperture value on the aperture ring step by step the presetting ring 303 is rotated in the clockwise direction intermittently whereby the signal lever 329 engaged with the arm 303c is moved intermittently downwards while the sector gear 318 is rotated in the clockwise direction intermittently. By means of the rotation of the sector gear 318 the slide member Ra$_1$ slides over the pulse generating switching means Ra whereby the aperture step number producing circuit 10' produces the pulses intermittently in the same way as in case with the priority on shutter time, which pulses is counted by the register 11' and compared by the coincidence detecting circuit 9' with the aperture signal operated in the same way as in case of the manual operation in such a manner that when the number of the pulses coincides with the aperture value signal the lamp L lights up.

Figure 6A:
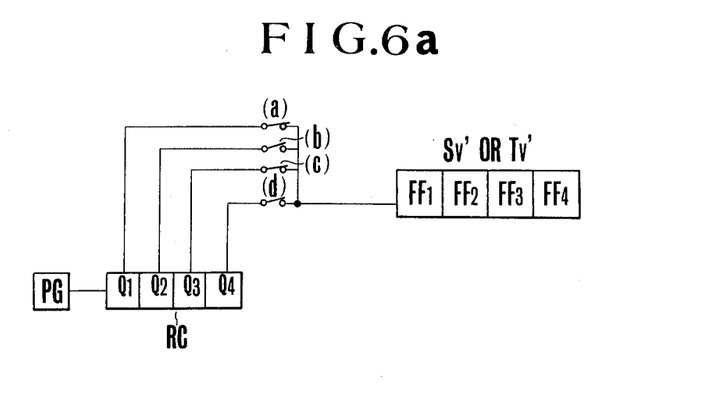
FIG. 6 shows the circuit by means of which a digital value corresponding to the film sensitivity or the shutter time is put in the shift register Tv' or Sv' shown in FIG. 2(a).
Figure 6B:
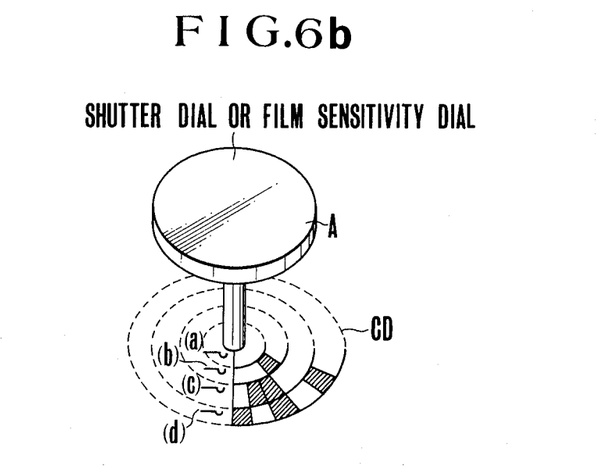

FIG. 6 shows the circuit diagram of an embodiment for putting the digital value corresponding to the shutter time value or the film sensitivity set by means of the dial into the sift register Sv' or Tv' shown in FIG. 2, whereby in FIG. 6(a), RC is the ring counter, PG the pulse generator, and (a) – (d) the contact switches shown in FIG. 6(a). The closing and the opening of these switches are determined by the contact states with the conductive pattern (black part) printed on the circular code disc CD to be rotated in functional engagement with the shutter dial or the film sensitivity dial A and the non-conductive pattern (white part). When the shutter time or the film sensitivity is set by means of the dial, the switched on state or the switched off state of the switches (a) – (d) is determined. When now as is shown in FIG. 6(a) the switches (a) and (c) are closed while the switches (b) and (d) are opened, PG delivers the pulses to the ring counter RC in such a manner that $Q_1$ produces the pulses which are put in the shift register. Then due to the pulse of PG, $Q_2$ produces the pulses whereby because the switch (b) is opened, the pulses are prevented from being delivered to the register. Further by means of the next pulse $Q_3$ produces the pulses which are put into the shift register through the switch (c). Further by means of the next pulse $Q_4$ produces the pulses which are, however, prevented from being put into the shift register because the switch (d) is opened. In consequence the digital value of "1010" is put into the shift register.

Further in case of the present embodiment the distance between the adjacent conductors is chosen in such a manner that the distance between the adjacent stop position of the aperture control mechanism while in case of the aperture control mechanism in which the distance between the adjacent stop position of the aperture control mechanism is not even, the distance between the adjacent conductors is so chosen that the position of the conductors are chosen in accordance with the driving speed of the above mentioned mechanism whereby the aperture control mechanism can be stopped at the position exactly corresponding to the produced pulse number in such a manner that the pulse number corresponds with the exposure amount in an exact way.

As explained above in case of the exposure amount control device in accordance with the present invention in functional engagement with the operation of the camera mechanism such as the aperture presetting ring and so on for determining the exposure amount the exposure informations amount determined by the mechanism are directly converted into digital electrical amount while for controlling the shutter speed or the aperture value the displacement of the mechanism is converted into pulse number by means of the comb-shaped conductive pattern and the brush slidable over the pattern whereby in order to make the relation between the displacement amount and the pulse number obtained from the comb-shaped conductive pattern and the brush linear, the distance between the adjacent combs is chosen so as to correspond with the sliding speed of the brush. Thus a linear relation is established between the pulse number and the above mentioned displacement amount so that by means of the aperture control member for determining the exposure amount in accordance with the displace amount an exact exposure control can be obtained, which is quite profitable.

What is claimed is:

1. An exposure amount control device for a camera comprising:

a. an exposure information signal forming means for forming the pulses whose number corresponds with the brightness of the object to be photographed, b. memory means for memorizing the pulses produced by the exposure information signal forming means,
c. an aperture control means for controlling the aperture size, said means determining the aperture size as a function of the position of said means,
d. a driving means for driving the aperture control means, the aperture control means being driven by means of said driving means so as to be displaced from the initial position, whereby the position of the aperture control means is determined by the displacement amount of the aperture control means driven by the driving means and the driving means induces the accelerated movement of the aperture control means at least during the initial movement of the driving,
e. a pulse converting means for converting the displacement amount of the aperture control means into a pulse number, said means including:
   1. a comb-shaped conductive pattern arranged on a base plate,
   2. a slide brush slidable over the comb-shaped conductive pattern in functional engagement with the driven aperture control means, whereby said brush is accelerated at least at the beginning of the slide motion, and the distance between the adjacent conductors of the pattern is increased along the sliding direction in accordance with the accelerated movement of said brush,
f. driving stop signal producing means for producing a driving stop signal when the pulses number from said pulse converting means and said pulse number memorized by said memory means reach a certain determined relation,
g. a position controlling means for controlling the displacement position of the aperture control means by stopping the driving of the aperture control means in response to the driving stop signal produced by the driving stop signal producing means.

2. An exposure amount control device for a camera in accordance with claim 1, wherein the distance between the adjacent conductors of the comb-shaped conductive pattern is gradually increased along the sliding direction and then equal to each other.

3. An exposure amount control device for a camera comprising:
a. an exposure information signal forming means for forming the pulses corresponding to he brightness of the object to be photographed,
b. memory means for memorizing the pulses produced by the exposure information signal forming means,
c. an aperture control means for controlling the aperture size,
d. a driving means for driving the aperture control means, said aperture control means being driven by said driving means so as to be displaced from its initial position whereby the aperture size controlled by the aperture control means is determined by the displace amount of the aperture control means,
e. a pulse converting means for converting the displace amount of the aperture control means into pulses, said means including:
   1. a comb-shaped conductive pattern arranged on a base plate,
   2. a slide brush slidable over the comb-shaped conductive pattern in functional engagement with the driving of the aperture control means, whereby the distance between the adjacent conductors of the comb-shaped conductive pattern is determined in accordance with the sliding speed of the slide brush,
f. driving stop signal producing means for producing a driving stop signal when the pulses number from said pulse converting means and said pulse number memorized by said memory means reach a certain determined relation,
g. a position controlling means for controlling the displacement position of the aperture control means by stopping the driving of the aperture control means in response to the driving stop signal produced by the driving stop signal producing means.

4. An exposure amount control device for a camera in accordance with claim 3, wherein the pulse converting means includes: a pattern is arranged at the slide starting position of the slide brush on the comb-shaped conductive pattern independently of the comb-shaped conductive pattern, whereby by means of the sliding of the slide brush, the slide starting position signal is obtained while the wear of the comb-shaped conductive pattern due to the sliding is prevented.

5. An exposure amount control device for a camera in accordance with claim 3, wherein the pulse converting means being so designed that the width of each conductor of the comb-shaped conductive pattern is chosen smaller than the distance between the adjacent conductors in such a manner that the time during which the circuit is closed is nearly equal to that during which the circuit is opened.

6. An exposure amount control device for a camera in accordance with claim 3, wherein the pulse converting means includes; a common return pattern being provided parallel to the sliding direction of the comb-shaped pattern, whereby the thickness as well as the outer shape of said common return pattern is changed while the terminal conductor of the comb-shaped conductive pattern and that of the common return pattern are provided at the end opposed to the other along the sliding direction.

7. An exposure amount control device for a camera:
a. a photographic information setting means for setting the photographic information as the mechanical displacement position,
b. a pulse converting means mechanically linked with the photographic information setting means so as to produce a pulse number corresponding to the displacement of the photographic information setting means, said means including:
   i. conductive pattern means provided on a base plate having a plurality of signal forming conductors
   ii. a slide brush functionally engaged with the displacement of the photographic setting means so as to be slid over the comb-shaped conductive pattern, whereby each conductor of the comb-shaped conductive pattern is positioned before the mechanical displacement position relative to the position of each conductor in accordance with the displacement speed of the photographic information setting means,
c. a stop signal producing means for producing a stop signal when the pulse number produced by the pulse converting means reaches a certain determined value, d. a means for stopping the displacement of the photographic information setting means in response to the stop signal, whereby the displacement amount of the displacement means due to the time delay since the pulse number reaches a certain determined amount till the displacement means actually stops is compensated by means of the proper position of each conductor of the comb-shaped conductive pattern in such a manner that the photographic information setting means stops at the mechanical displacement position determined by the pulse number produced by the pulse converting means.

8. An exposure amount control device for a camera in accordance with claim 7, wherein the pulse converting means includes: a pattern arranged at the slide starting position of the slide brush on the conductive pattern independently of the conductive pattern, whereby by means of the sliding of the slide brush, the slide starting position signal is obtained while the wear of the comb-shaped conductive pattern due to the sliding is prevented.

9. An exposure amount control device for a camera in accordance with claim 7, wherein the pulse converting means being so designed that the width of each conductor of the conductive pattern is chosen smaller than the distance between the adjacent conductors in such a manner that the time during which the circuit is closed is nearly equal to that during which the circuit is opened.

10. An exposure amount control device for a camera in accordance with claim 7, wherein the pulse converting means includes: a common return pattern being provided parallel to the sliding direction of the conductive pattern, whereby the thickness as well as the outer shape of said common return pattern is changed while the terminal conductor of the comb-shaped conductive pattern and that of the common return pattern are provided at the end opposed to the other along the sliding direction.

11. An exposure amount control device for a camera in accordance with claim 7, wherein the distance between the adjacent conductors of the conductive pattern is gradually increased along the sliding direction and then equal to each other.

12. An exposure control device for a camera comprising:
 a. a photographic information setting means for setting the photographic information as the mechanical displacement position;
 b. a pulse converting means coupled to the photographic information setting means so as to produce a pulse number corresponding to the displacement of the photographic information setting means, said means including:
  i. signal forming means having plurality of signal forming elements,
  ii. a detecting means which operates in association with the displacement of said photographic information setting means and relatively scanning said signal forming means and the space between individual elements of the plurality of signal forming elements corresponds to the displacement speed of the photographic information setting means;
 c. a stop signal producing means for producing a stop signal when the pulse number produced by the pulse converting means reaches a certain determined value; and
 d. a means for stopping the displacement of the photographic information setting means in response to the stop signal.

13. An exposure control device for a camera comprising:
 a. an exposure information signal forming means for forming the pulses corresponding to the brightness of the object to be photographed;
 b. memory means for memorizing the pulses produced by the exposure information signal forming means;
 c. an aperture control means for controlling the aperture size;
 d. a driving means for driving the aperture control means, said aperture control means being driven by said driving means so as to be displaced from its initial position whereby the aperture size controlled by the aperture control means is determined by the displace amount of the aperture control means;
 e. a pulse converting means for converting the displace amount of the aperture control means into pulses, said means including:
  i. signal forming means having plurality of signal forming elements,
  ii. a detecting means which operates in association with the displacement of said aperture control means and relatively scanning said signal forming means and the space between individual elements of the plurality of signal forming elements corresponds to the displacement speed of the photographic information setting means;
 f. driving stop signal producing means for producing a driving stop signal when the pulses number from said pulse converting means and said pulse number memorized by said memory means reach a certain determined relation; and
 g. a position controlling means for controlling the displacement position of the aperture control means by stopping the driving of the aperture control means in response to the driving stop signal produced by the driving stop signal producing means.

14. An exposure control device for a camera comprising:
 a. an exposure information signal forming means for forming the pulses corresponding to the brightness of the object to be photographed;
 b. memory means for memorizing the pulses produced by the exposure information signal forming means;
 c. an aperture control means for controlling the aperture size;
 d. a driving means for driving the aperture control means, said aperture control means being driven by said driving means so as to be displaced from its initial position whereby the aperture size controlled by the aperture control means is determined by the displace amount of the aperture control means;
 e. a pulse converting means for converting the displace amount of the aperture control means into pulses, said means including:

i. conductive pattern means arranged on a base plate having a plurality of signal forming conductors, and ii. a slide brush slidable over the conductive pattern means in functional engagement with the driving of the aperture control means, whereby the distance between the adjacent conductors of the conductive pattern means is determined in accordance with the sliding speed of the slide brush;

f. driving stop signal producing means for producing a driving stop signal when the pulses number from said pulse converting means and said pulse number memorized by said memory means reach a certain determined relation; and g. a position controlling means for controlling the displacement position of the aperture control means by stopping the driving of the aperture control means in response to the driving stop signal produced by the driving stop signal producing means.

* * * * *